US009709046B2

(12) United States Patent
Krittian et al.

(10) Patent No.: US 9,709,046 B2
(45) Date of Patent: Jul. 18, 2017

(54) HYDROSTATIC POWER UNIT AS HYDRAULIC STARTER OF AN INTERNAL COMBUSTION ENGINE

(71) Applicant: Linde Hydraulics GmbH & Co. KG, Aschaffenburg (DE)

(72) Inventors: Lukas Krittian, Aschaffenburg (DE); Martin Steigerwald, Glattbach (DE); Martin Oberhausser, Aschaffenburg (DE); Alfred Langen, Ascahffenburg (DE)

(73) Assignee: Linde Hydraulics GmbH & Co. KG, Aschaffenburg (DE)

( * ) Notice: Subject to any disclaimer, the term of this patent is extended or adjusted under 35 U.S.C. 154(b) by 424 days.

(21) Appl. No.: 14/082,547

(22) Filed: Nov. 18, 2013

(65) Prior Publication Data
US 2014/0212300 A1    Jul. 31, 2014

(30) Foreign Application Priority Data

Nov. 22, 2012    (DE) .......................... 10 2012 111 300

(51) Int. Cl.
*F02N 7/00*        (2006.01)
*F04B 35/00*    (2006.01)
(Continued)

(52) U.S. Cl.
CPC .............. *F04B 35/002* (2013.01); *F02N 7/00* (2013.01); *F02N 11/0814* (2013.01); *F03C 1/26* (2013.01);
(Continued)

(58) Field of Classification Search
CPC ........................ B60K 17/356; B60K 2006/126
See application file for complete search history.

(56) References Cited

U.S. PATENT DOCUMENTS 3,252,426 A  *  5/1966  Parr .......................... F02N 7/08
                                                                    417/222.1
3,463,087 A  *  8/1969  Grant ...................... F16H 61/42
                                                                    60/389

(Continued)

FOREIGN PATENT DOCUMENTS

CN          1403267 A     3/2003
CN        101155997 A     4/2008
(Continued)

*Primary Examiner* — Devon Kramer
*Assistant Examiner* — Kenneth J Hansen
(74) *Attorney, Agent, or Firm* — The Webb Law Firm (57) ABSTRACT

A variable displacement hydrostatic power unit (7) is in a drive connection with an internal combustion engine (2). When operated as a pump, the power unit (7) delivers hydraulic fluid to at least one consumer (V). When operated as a motor, the power unit (7) is a hydraulic starter for the internal combustion engine (2) and is supplied with hydraulic fluid from a hydraulic accumulator (25). The displacement volume of the power unit (7) is set by a displacement volume control device (50) actuated by a positioning device (52). The displacement volume control device (50) is displaced into a position with maximum displacement volume by a corresponding actuation of the positioning device (52) chronologically prior to the shutoff of the internal combustion engine (2). A securing device (60) holds the displacement volume control device (50) in the maximum displacement volume position when the internal combustion engine (2) is shut off.

17 Claims, 2 Drawing Sheets

(51) Int. Cl.
    *F02N 11/08*     (2006.01)
    *F04B 17/05*     (2006.01)
    *F03C 1/26*     (2006.01)
    *F02D 41/04*     (2006.01)
    *B60K 6/12*     (2006.01)

(52) U.S. Cl.
    CPC ........ *F04B 17/05* (2013.01); *B60K 2006/126* (2013.01); *F02D 41/042* (2013.01); *F15B 2211/20553* (2013.01)

(56) References Cited

U.S. PATENT DOCUMENTS

| | | | |
|---|---|---|---|
| 6,030,182 A * | 2/2000 | Voigt | F04B 1/324 |
| | | | 417/222.1 |
| 6,878,317 B2 | 4/2005 | Kubota | |
| 7,926,265 B2 | 4/2011 | Mueller et al. | |
| 8,033,107 B2 | 10/2011 | Tikkanen | |
| 2007/0079609 A1* | 4/2007 | Brinkman | E02F 9/2217 |
| | | | 60/413 |

FOREIGN PATENT DOCUMENTS

| | | |
|---|---|---|
| CN | 101341342 A | 1/2009 |
| DE | 2542244 A1 | 3/1977 |
| DE | 102009056153 A1 | 6/2011 |
| EP | 2308795 A1 | 4/2011 |

* cited by examiner

Fig. 2

HYDROSTATIC POWER UNIT AS HYDRAULIC STARTER OF AN INTERNAL COMBUSTION ENGINE

CROSS REFERENCE TO RELATED APPLICATIONS

This application claims priority to German Application No. DE 102012111300.9 filed Nov. 22, 2012, which is herein incorporated by reference in its entirety.

BACKGROUND OF THE INVENTION

Field of the Invention

This invention relates to a hydrostatic power unit in the form of a variable displacement machine with a continuously variable displacement volume, which power unit can be operated as a pump and as a motor and is in a drive connection with an internal combustion engine. When the power unit is operated as a pump, a suction side sucks hydraulic fluid from a tank and delivers into a delivery line that leads to at least one consumer. When the power unit is operated as a motor, it is a hydraulic starter to start the internal combustion engine. When the power unit is operated as a motor, hydraulic fluid from a hydraulic accumulator can be supplied to the suction side. The displacement volume of the power unit can be varied by a displacement volume control device that can be actuated with a positioning device.

Description of Related Art

Hydrostatic power units of this general type, when operated as a pump in which the power unit is driven by the internal combustion engine, are used to supply at least one consumer with hydraulic fluid. When these hydrostatic power units are operated as a motor, they are used as a hydraulic starter to start the shut-off internal combustion engine. Such hydrostatic power units are used in mobile machines, such as in industrial trucks, agricultural equipment, forestry equipment, and construction equipment, such as excavators, wheeled and telescoping loaders, tractors, combine harvesters, forage harvesters, and sugar beet or potato diggers, for example.

To reduce fuel consumption during pauses or interruptions in work, a start-stop function is provided for the internal combustion engine such that the internal combustion engine, when running at no load, is shut off during pauses or interruptions in the work, and is automatically restarted when torque is requested by a work function or by the traction drive. A rugged and reliable start-stop function of the internal combustion engine of this type can be achieved with a hydraulic starter.

EP 2 308 795 A1 describes a hydrostatic power unit of a similar type which, when operated as a pump driven by an internal combustion engine, sucks hydraulic fluid via a suction side out of a tank and supplies the consumer of the working hydraulics with hydraulic fluid. When operated as a motor, in which mode hydraulic fluid is delivered to the suction side from a hydraulic accumulator and the power unit is driven by the hydraulic fluid from the hydraulic accumulator, the power unit is used as a hydraulic starter to start the shut-off internal combustion engine.

If the power unit is in the form of a variable displacement machine with a continuously variable displacement volume, for operation as a motor the power unit must be set to a position with the maximum displacement volume sufficient to provide the torque output required to start the internal combustion engine. From EP 2 308 795 A1 (FIG. 2), it is known that a variable displacement device which controls the displacement volume of the power unit can be connected with the hydraulic accumulator so that when the internal combustion engine is shut off, the displacement volume control device of the power unit can be actuated with the hydraulic fluid from the hydraulic accumulator. For this purpose, the hydraulic accumulator is in communication via a pressure reducer valve with a charging pressure circuit which, when the internal combustion engine is running, supplies the variable displacement device of the power unit with hydraulic fluid. The charging pressure circuit is connected to the hydraulic accumulator downstream of a valve device which controls the operation of the power unit as a motor by a connection between the hydraulic accumulator and the suction side of the power unit. The displacement volume control device is adjusted with the hydraulic fluid from the hydraulic accumulator into the position with the maximum displacement volume chronologically immediately prior to the starting process of the internal combustion engine. However, on account of the actuation of the displacement volume control device at the beginning of the starting process, there is a time lag in the starting process of the internal combustion engine. This time lag has disadvantages for a start-stop function in which the starting process of the internal combustion engine must occur in a short period of time.

Therefore, it is an object of the invention to provide a hydrostatic power unit of the general type described above but which with little added construction effort or expense makes it possible to start the internal combustion engine with the power unit operating as a motor in a shorter period of time than with other known devices.

SUMMARY OF THE INVENTION

The invention accomplishes this object in that the displacement volume control device is actuated into the position with the maximum displacement volume by a corresponding actuation of the positioning device chronologically before the shutoff of the internal combustion engine. A securing device is provided which, when the internal combustion engine is shut off, holds the displacement volume control device in the position with the maximum displacement volume. With the power unit of the invention, the displacement volume control device is therefore actuated into the position with the maximum displacement volume before the stopping and shutoff of the internal combustion engine, for example, during a pause or an interruption in the work, and is secured in this position by the securing device when the internal combustion engine is shut off. To start the internal combustion engine, the suction side of the power unit is pressurized with hydraulic fluid from the hydraulic accumulator. The displacement volume control device of the power unit is already held by the securing device in the position with the maximum displacement volume at the beginning of the process of starting the internal combustion engine. Thus, the process of starting the internal combustion engine can take place immediately and no actuation of the displacement volume control device to the maximum displacement volume is necessary at the beginning of the starting process. In view of the securing device and the corresponding adjustment of the power unit to the position with maximum displacement volume before the internal combustion engine is shut off, when the power unit is operated as a motor, it therefore becomes easily possible and with little added construction effort or expense to start the shut off internal combustion engine in a short period of time.

In one advantageous embodiment of the invention, the positioning device for the supply of hydraulic fluid is connected to a charging pressure circuit and to the hydraulic accumulator and the securing device is in the form of a shutoff valve located in the connection between the positioning device and the charging pressure circuit. A hydraulic or electro-hydraulic positioning device can be supplied in a simple manner with hydraulic fluid for the adjustment and actuation of the displacement volume control device via a connection with the charging pressure circuit and with the hydraulic accumulator. The connection of the positioning device with the hydraulic accumulator makes it possible in a simple manner to ensure that the control pressure required to hold the displacement volume control device in the position with the maximum displacement volume is available from the charged hydraulic accumulator when the internal combustion engine is shut off. The shutoff valve forms a hydraulic securing device which prevents the depressurization of the hydraulic accumulator via the charging pressure circuit when the internal combustion engine is turned off, so that when the internal combustion engine is shut off, the displacement volume control device can be securely held in the position with the maximum displacement volume by the control pressure made available from the hydraulic accumulator.

In one advantageous embodiment of the invention, the shutoff valve is a check valve that shuts off the flow to the charging pressure circuit. With a check valve of this type, when the internal combustion engine is shut off, it is possible in a simple manner to isolate the positioning device (which is supplied from the hydraulic accumulator) from the charging pressure circuit to prevent a depressurization of the hydraulic accumulator.

It is particularly advantageous if an electrically actuated control valve is provided to control the connection of the hydraulic accumulator with the suction side of the power unit. The positioning device can be supplied with hydraulic fluid from the hydraulic accumulator independently of the position of the control valve. The connection of the hydraulic accumulator with the suction side of the hydraulic pump can advantageously be controlled by an electrically actuated control valve. With an electrically actuated control valve, the operation of the hydraulic pump as a motor during a starting process of the shut off internal combustion engine can be controlled in a simple manner. If the positioning device can be supplied with hydraulic fluid from the hydraulic accumulator independently of the position of the control valve, it becomes possible in a simple manner to supply the positioning device with hydraulic fluid from the hydraulic accumulator even when the control valve is in the closed position. When the internal combustion engine is shut off and the control valve is in the closed position, the actuating pressure to keep the displacement volume control device in the position with maximum displacement volume can be provided from the charged hydraulic accumulator.

In one advantageous embodiment of the invention, the control valve is located in a connecting line that leads from the hydraulic accumulator to an intake line of the hydraulic pump. The intake line runs from the tank to the suction side of the hydraulic pump. A hydraulic line is connected to the connecting line upstream of the control valve and supplies the positioning device with hydraulic fluid from the hydraulic accumulator. As a result of the connection of the hydraulic line that leads to the positioning device to the connecting line upstream of the control valve, it becomes possible in a simple manner to maintain the proper control pressure when the internal combustion engine is shut off, because the hydraulic accumulator is in communication with the positioning device regardless of the position of the control valve (even when the control valve is in a closed position).

It is particularly advantageous if the hydraulic line is connected to a control pressure line that leads from the charging pressure circuit to the positioning device. The shutoff valve is located in the control pressure line. The hydraulic line is connected to the control pressure line between the shutoff valve and the positioning device. With a connection of this type of the hydraulic line to the control pressure line equipped with the shutoff valve, it is possible in a simple manner to prevent the depressurization of the hydraulic accumulator to the charging pressure circuit when the internal combustion engine is shut off. Thus, the control pressure to hold the displacement volume control device can be maintained in a simple manner from the hydraulic accumulator when the internal combustion engine is shut off.

In an alternative and likewise advantageous embodiment of the invention, the securing device is in the form of a mechanical interlock of the displacement volume control device. With a mechanical and preferably positive interlock, it is also possible with little added construction effort or expense and in a simple manner to hold the displacement volume control device in the position with the maximum displacement volume after actuation when the internal combustion engine is shut off, and to securely prevent a resetting of the displacement volume control device into a position with the minimum displacement volume.

In one advantageous embodiment of the invention, the mechanical interlock is formed by interlocking means (also referred to as an interlocking arrangement) that have an interlocked position and a released position, and which can be brought into a positive operative connection with the displacement volume control device in the position with the maximum displacement volume. With interlocking means of this type, which can be actuated between a released position and an interlocked position and which in the interlocked position can be engaged in a positive manner in the displacement volume control device, it is possible to achieve a simply constructed mechanical securing and fixing of the displacement volume control device in the position with the maximum displacement volume.

In one preferred embodiment of the invention, the interlocking means are in the form of an interlocking lever. With an interlocking lever, which can be engaged, for example, by means of an interlocking hook in a corresponding recess in the displacement volume control device, a simply constructed securing of the displacement volume control device in the position with the maximum displacement volume can be achieved.

The interlocking means can be actuated into the interlocked position by a spring device and into the released position by an electrical actuator device. In one preferred embodiment of the invention, the interlocking means are actuated into a released position by a spring device and into an interlocked position by the electrical actuator device. This arrangement guarantees a high level of operational reliability because, when the electrical actuator device is de-energized, the interlocking means are actuated into the released position by the spring device.

The electrical actuator device is preferably in the form of an actuating magnet (switching magnet), as a result of which the interlocking means can be actuated into the interlocked position with little extra construction effort or expense.

When the displacement volume control device reaches the position with the maximum displacement volume, the interlocking means can advantageously be actuated into the interlocked position, so that the displacement volume control device can be held securely in the position with the maximum displacement volume when the internal combustion engine is shut off.

If the interlocking means can be actuated into the released position after the start of the internal combustion engine, it becomes possible in a simple manner to adjust the displacement volume control device toward a reduction of the displacement volume, to take a load off the running internal combustion engine, and, when a consumer is actuated, to adjust the displacement volume of the power unit being operated as a pump to the volume flow required by the consumer.

In one advantageous embodiment of the invention, the displacement volume control device is actuated by the spring device toward a minimum displacement volume. When the internal combustion engine is running and no consumer is actuated, it thereby becomes possible in a simple manner to ensure that the power unit being operated as a pump is in the position with the minimum displacement volume, preferably a position with a displacement volume of zero, which also results in low losses.

In one advantageous embodiment of the invention, the power unit is a unilaterally variable displacement power unit and the displacement volume control device of the power unit can be displaced starting from a position with minimum displacement volume in one direction of actuation. Unilaterally variable displacement power units are operated in an open circuit and make it possible to supply the connected consumers with hydraulic fluid with little extra construction effort or expense and consume very little energy when the power unit is operated as a pump. As a result of the displacement and actuation of the displacement volume control device into the position with the maximum displacement volume before the shutdown of the internal combustion engine and the securing of the displacement volume control device in the position with maximum displacement volume by the securing device when the internal combustion engine is shut off, a power unit in the form of a unilaterally variable displacement pump can be operated in a simple manner as a motor, which makes possible a rapid starting of the internal combustion engine which has a start-stop function.

It is particularly advantageous if the consumer is in the form of working hydraulics of a machine. The power unit, when operated as a pump, supplies the working hydraulics with hydraulic fluid. The variable displacement pump (which is already present to supply the working hydraulics) can therefore be easily used as a hydraulic starter to start the internal combustion engine, to make possible a start-stop function of the internal combustion engine.

The power unit is preferably in the form of an axial piston machine that employs a swashplate construction.

The invention further relates to a drive train of a vehicle, in particular a mobile machine, with a hydrostatic power unit of the invention driven by an internal combustion engine. The power unit, when operated as a motor, forms a hydraulic starter for the internal combustion engine and, when operated as a pump, supplies the working hydraulics of the machine with hydraulic fluid. With the hydrostatic power unit of the invention, a start-stop function can easily be added to a vehicle which makes possible a short starting time of the shut off internal combustion engine.

The invention relates to a method for the operation of a drive train of the invention, whereby chronologically prior to the shutdown of the internal combustion engine, the displacement volume control device of the power unit is moved by an actuation of the positioning device into the position with the maximum displacement volume, and is held in this position by the securing device when the internal combustion engine is shut off. A rapid startup of the internal combustion engine therefore becomes possible with a start-stop function when the power unit is operated as a motor because, at the beginning of the starting process, the power unit is already in the position with the maximum displacement volume and no adjustment of the displacement volume control device of the power unit at the beginning of the starting process of the internal combustion engine is necessary.

With a securing device in the form of a mechanical interlock, the interlocking means are advantageously actuated into the interlocked position when the position with maximum displacement volume is reached, and actuated into the released position after the startup of the internal combustion engine. This makes it possible in a simple manner, when the internal combustion engine is shut off, to hold the displacement volume control device of the power unit in the position with the maximum displacement volume for the operation of the power unit as a motor during a starting process of the internal combustion engine and, after the starting process of the internal combustion engine, to release the displacement volume control device again, to reduce the displacement volume when the internal combustion engine is running on its own and, when the power unit is operated as a pump, to be able to adjust the displacement volume according to the volume flow required when a consumer is actuated.

BRIEF DESCRIPTION OF THE DRAWINGS

Additional advantages and details of the invention are explained in greater detail below with reference to the exemplary embodiments illustrated in the accompanying schematic figures, in which like reference numbers identify like parts throughout.

DESCRIPTION OF THE PREFERRED EMBODIMENTS

Figure 1:
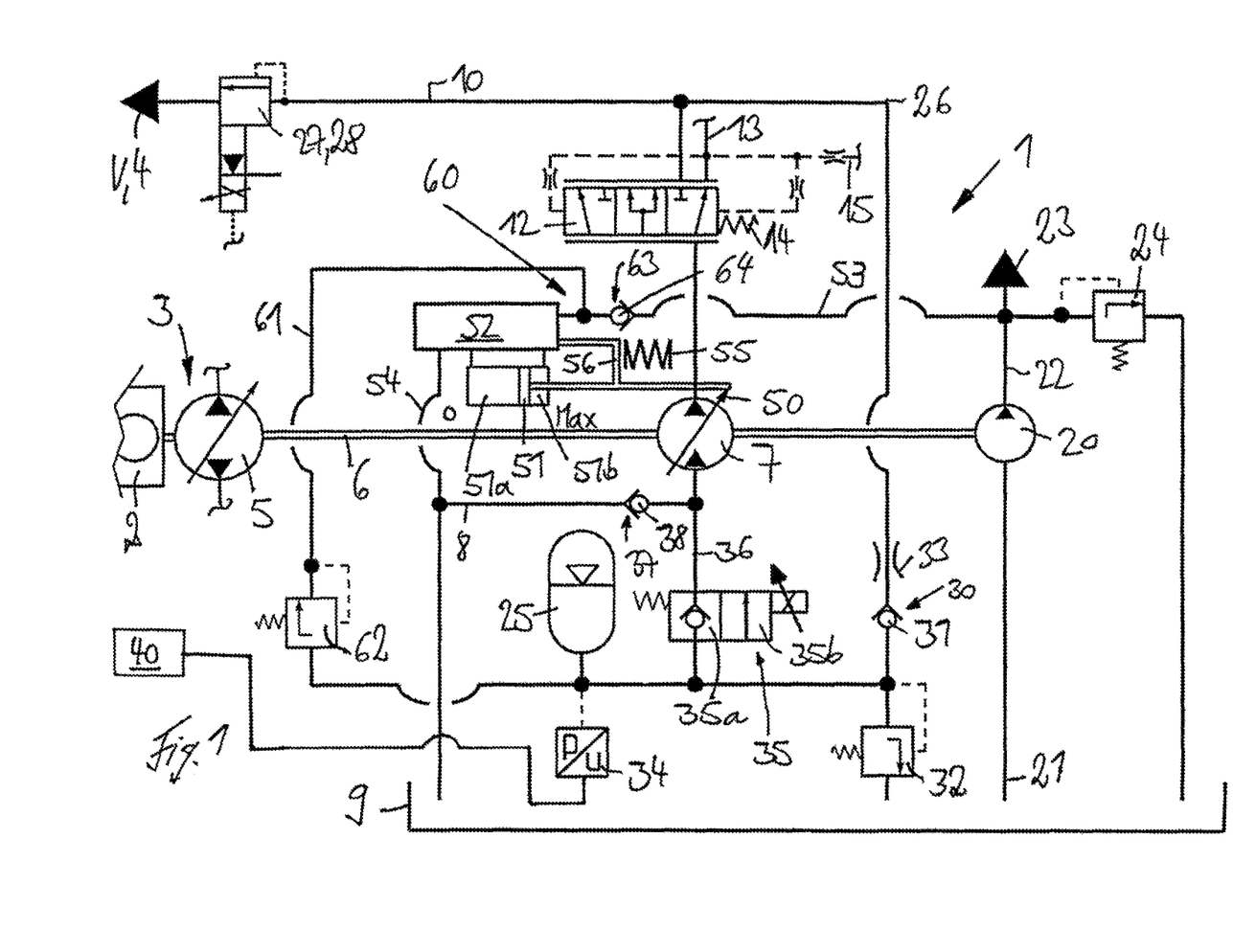
FIG. 1 shows a vehicle drive train with a first embodiment of a power unit of the invention.

FIG. 1 shows a schematic illustration of a drive train 1 of a mobile machine, such as an industrial truck or a piece of construction or agricultural equipment, with a hydrostatic power unit 7 of the invention.

The drive train 1 includes an internal combustion engine 2, such as a diesel engine, a traction drive 3 driven by the internal combustion engine 2, and working hydraulics 4 in the form of hydraulic consumers V driven by the internal combustion engine 2.

In the illustrated exemplary embodiment, the traction drive 3 is a hydrostatic traction drive having a variable displacement drive pump 5, which is driven by a drive connection with an output shaft 6 of the internal combustion engine 2. The drive pump 5 is in communication with one or more constant-displacement or variable-displacement hydraulic motors in a closed circuit, which hydraulic motors are in an operative connection with the driven wheels of the machine in a conventional manner.

The traction drive 3 can alternatively be in the form of an electric traction drive with an electric generator driven by the internal combustion engine 2 and one or more electric drive motors. The traction drive 3 can also be a mechanical traction drive with a mechanical transmission, such as a multi-speed transmission, or a power split transmission, or a torque converter transmission.

The working hydraulics 4 comprise work functions of the machine, such as, on an industrial truck for example, working hydraulics for the actuation of load handling means on a lifting mast, or on a piece of construction equipment in the form of an excavator, for example, the working functions of the working equipment in the form of a shovel.

The hydrostatic power unit 7 (which is in the form of a variable displacement machine with a continuously variable displacement volume) is provided to supply the consumer V formed by the working hydraulics 4 with hydraulic fluid. The power unit 7 is preferably an axial piston machine employing a swashplate construction. The power unit 7 is operated in an open circuit and is driven by a drive connection with the output shaft 6 of the internal combustion engine 2.

The power unit 7 is in communication on its suction side (input side) with a tank 9 by means of an intake line 8. A delivery line 10, which is in communication with the output side (delivery side) of the power unit 7, is connected to a control valve device, by means of which the hydraulic consumers of the working hydraulics 4 can be controlled. The control valve device preferably includes one or more directional control valves for actuation of the consumers. In the illustrated exemplary embodiment, a priority valve 12 is also provided, by means of which the priority supply of a consumer supplied by the power unit 7, such as a hydraulic steering device, can be ensured. The priority valve 12 is in communication on the input side with the delivery side of the power unit 7 and is in communication on the output side with the delivery line 10 that leads to the working hydraulics 4 as well as a delivery line 13 that leads to the steering device. The priority valve 12 is controlled by a spring 14 and by the load pressure of the steering device present in a load pressure line 15.

The drive train 1 further includes a charge pump 20 driven by its connection with the output shaft 6. In the illustrated exemplary embodiment, the charge pump 20 is a constant displacement pump with a constant displacement volume and is operated in an open circuit. The suction side of the charge pump 20 is in communication by means of an intake line 21 with the tank 9 and delivers into a charge pressure line 22 connected to the delivery side, to which the corresponding consumers of a charging pressure circuit 23 are connected, for example, such as control (displacement) devices to adjust the displacement volume of the drive pump 5 and of the power unit 7, a supply device of the hydrostatic traction drive, a brake system of the vehicle, and pilot valves for the control valves of the working hydraulics 4. To protect the charge pressure in the charging pressure circuit 23, a pressure limiting device 24, such as a pressure relief valve, is operatively associated with the charge pressure line 22.

In the drive train 1 of the invention, the power unit 7 of the working hydraulics 4 is a two-quadrant power unit which can be operated as a pump and a motor in the same direction of operation and the same flow direction of the hydraulic fluid.

When operated as a pump, the power unit 7 sucks in hydraulic fluid from the tank 9 via the intake line 8 and delivers the hydraulic fluid via the priority valve 12 into the delivery line 10 of the working hydraulics 4 and/or the delivery line 13 of the steering device. When operated as a motor, in which the power unit 7 acts as the hydraulic starter of a start-stop function to start the internal combustion engine 2, the power unit 7 is driven on the suction side with hydraulic fluid from a hydraulic accumulator 25.

For charging with hydraulic fluid, the hydraulic accumulator 25 is connected by means of a connecting line 26 to the delivery line 10 of the power unit 7 that leads to the working hydraulics 4.

An electrically actuated charging valve 27 is located in the delivery line 10 which, when it is actuated, is actuated into a throttling position in which it throttles the delivery line 10 to build up a pressure. The charging valve 27 is preferably a retarder valve 28 which, during the braking of the vehicle, is actuated into a throttling position so that by building up pressure in the delivery line 10, an additional decelerating torque can be impressed on the output shaft 6 (i.e., the crankshaft), which counteracts the motor-torque generated by the drive pump 5 and, thus, decelerates the vehicle. In a braking operation of this type with a throttling retarder valve 28, it is also possible in a simple manner to recover the braking energy and charge the hydraulic accumulator to utilize the kinetic energy of the vehicle during a braking process. The connecting line 26 is connected to the delivery line 10 upstream of the charging valve 27 and, therefore, between the charging valve 27 and the priority valve 12.

A shutoff valve 30 is located in the connecting line 26, which in the illustrated example is a check valve 31, that opens automatically and as a function of the pressure to allow flow to the hydraulic accumulator 25. Also associated with the connecting line 26 between the shutoff valve 30 and the hydraulic accumulator 25 is a pressure relief valve 32 to control the pressure in the hydraulic accumulator 25. Also located in the connecting line 26 to limit the charging volume flow of the hydraulic accumulator 25 is a flow control device 23, which can be a diaphragm or throttle. The flow control device 33 can (as illustrated) be located upstream of the shutoff valve 30 or, alternatively, downstream of the shutoff valve 30.

Also associated with the hydraulic accumulator 25 is a pressure sensor 34. The pressure sensor 34 monitors the charging pressure and thus the charge status of the hydraulic accumulator 25.

The connection of the hydraulic accumulator 25 with the suction side of the power unit 7 for operation of the power unit 7 as a motor can be controlled by a electrically actuated control valve 35. The control valve 35 has a closed position 35*a* and an open position 35*b*. The closed position 35*a* is preferably leak-tight with a shutoff valve that shuts off the flow to the power unit 7.

The control valve 35 is located in a connecting line 36 which runs from the hydraulic accumulator 25 to the intake line 8 that leads to the suction side of the power unit 7. The connecting line 26 equipped with the shutoff valve 30 is thereby connected to the connecting line 36 between the control valve 35 and the hydraulic accumulator 25.

Located in the intake line 8 of the power unit 7 is a shutoff valve 37 that shuts off the flow to the tank 9 and is preferably a check valve 38 that shuts off the flow to the tank 9.

An electronic control device 40 is in communication on the input side with the pressure sensor 34 and is used to actuate the charging valve 27 and the control valve 35.

The power unit 7, in the form of a variable displacement machine with a continuously variable displacement volume, has a displacement volume control device 50 to set the displacement volume, for example, a swashplate with a variable inclination of an axial piston machine that employs a swashplate construction. The displacement volume control device 50 can be actuated by an actuator piston device 51 which is in an operative connection with the displacement volume control device 50. The power unit 7 of the invention is in the form of a unilaterally variable displacement power unit, in which the displacement volume control device 50, starting from a position with a minimum displacement volume, preferably a position with a displacement volume of zero, can be displaced in one control direction or swiveling direction into a position with a maximum displacement volume. The actuator piston device 51 has an actuator pressure compartment 51 a that acts in the direction of the maximum displacement volume, and an actuator pressure compartment 5 lb that acts in the direction of the minimum displacement volume.

The displacement volume control device 50 can be controlled by a positioning device 52. The positioning device 52 has a control valve, with which the pressurization of the control pressure compartments 51a, 51b of the actuator piston device 51 of the displacement volume control device 50 can be controlled with a control pressure or can be depressurized to the tank 9.

The positioning device 52, for the supply with hydraulic fluid and for the generation of an actuation pressure in the actuation pressure compartments 51a and 51b by means of the control pressure line 53, is in communication with the charge pressure line 22 and, thus, the charging pressure circuit 23. The positioning device 52 also has a connection to a tank line 54 that leads to the tank 9. The positioning device 52 is preferably actuated electrically and for this purpose is connected with the electronic control device 40. In the illustrated exemplary embodiment, the positioning device 52 is in the form of a high-response proportional valve. There is a mechanical feedback 56 of the actual position of the displacement volume control device 50 on the positioning device 52. A spring device 55, in the form of a compression spring, is also provided which actuates the displacement volume control device 50 toward the minimum displacement volume, and which can be limited by a corresponding stop on the displacement volume control device 50.

On the power unit 7 of the invention, during start-stop operation of the internal combustion engine 2, the displacement volume control device 50 is actuated into the position with a maximum displacement volume by a corresponding actuation of the positioning device 52 chronologically prior to the stopping and shutoff of the internal combustion engine 2. To achieve an immediate starting process of the internal combustion engine 2 when the power unit 7 is operated as a motor with the control valve 35 actuated into the open position 35b, without prior actuation and adjustment of the displacement volume control device 50 into the position with a maximum displacement volume, a securing device 60 is provided which holds the displacement volume control device 50 in the position with maximum displacement volume when the internal combustion engine 2 is shut off.

The positioning device 52 is also connected to the hydraulic accumulator 25 for the supply of hydraulic fluid and, thus, for the supply of a control pressure. For which purpose, a hydraulic line 61, in which a pressure reducer valve 62 is located, leads from the control pressure line 53 to the connecting line 36. The hydraulic line 61 is connected to the connecting line 36 upstream of the control valve 35 and thus between the hydraulic accumulator 25 in the control valve 35. The securing device 60 also comprises a shutoff valve 63 located in the control pressure line 53. The hydraulic line 61 is connected to the control pressure line 53 between the shutoff valve 63 and the positioning device 52. The shutoff valve 63, in the illustrated exemplary embodiment, is in the form of a check valve 64 that opens to allow flow to the positioning device 52.

By means of the hydraulic line 61 and the connection of the positioning device 52 with the hydraulic accumulator 25, it becomes possible to provide, from the hydraulic accumulator 25 via the pressure reducing valve 62, the control pressure to hold the displacement volume control device 50 in the position with the maximum displacement volume when the internal combustion engine 2 is shut off, so that when the internal combustion engine 2 is shut off, the displacement volume control device 50 is held by the hydraulic accumulator 25 in the position with the maximum displacement volume. The shutoff valve 63 prevents the hydraulic accumulator 25 from discharging via the charging pressure circuit 23 when the internal combustion engine 2 is shut off. When the internal combustion engine 2 is shut off, the shutoff valve 63 isolates the positioning device 52 from the charging pressure circuit 23.

The securing device 60 in FIG. 1 makes it possible for the displacement volume control device 50 to be held in the position with the maximum displacement volume when the internal combustion engine 2 is shut off, so that on the occasion of a starting process of the internal combustion engine 2 and an actuation of the control valve 35 into the open position 35b, whereby hydraulic fluid flows out of the charged hydraulic accumulator 25 to the suction side of the power unit 7, a direct operation of the power unit 7 as a motor makes possible the rapid start of the internal combustion engine 2 without a prior adjustment of the displacement volume control device 50 into the position with maximum displacement volume because the displacement volume control device 50 is already in the position with maximum displacement volume. A starting process of the internal combustion engine 2 with the power unit 7 of the invention in a start-stop function therefore occurs in a short period of time.

Figure 2:
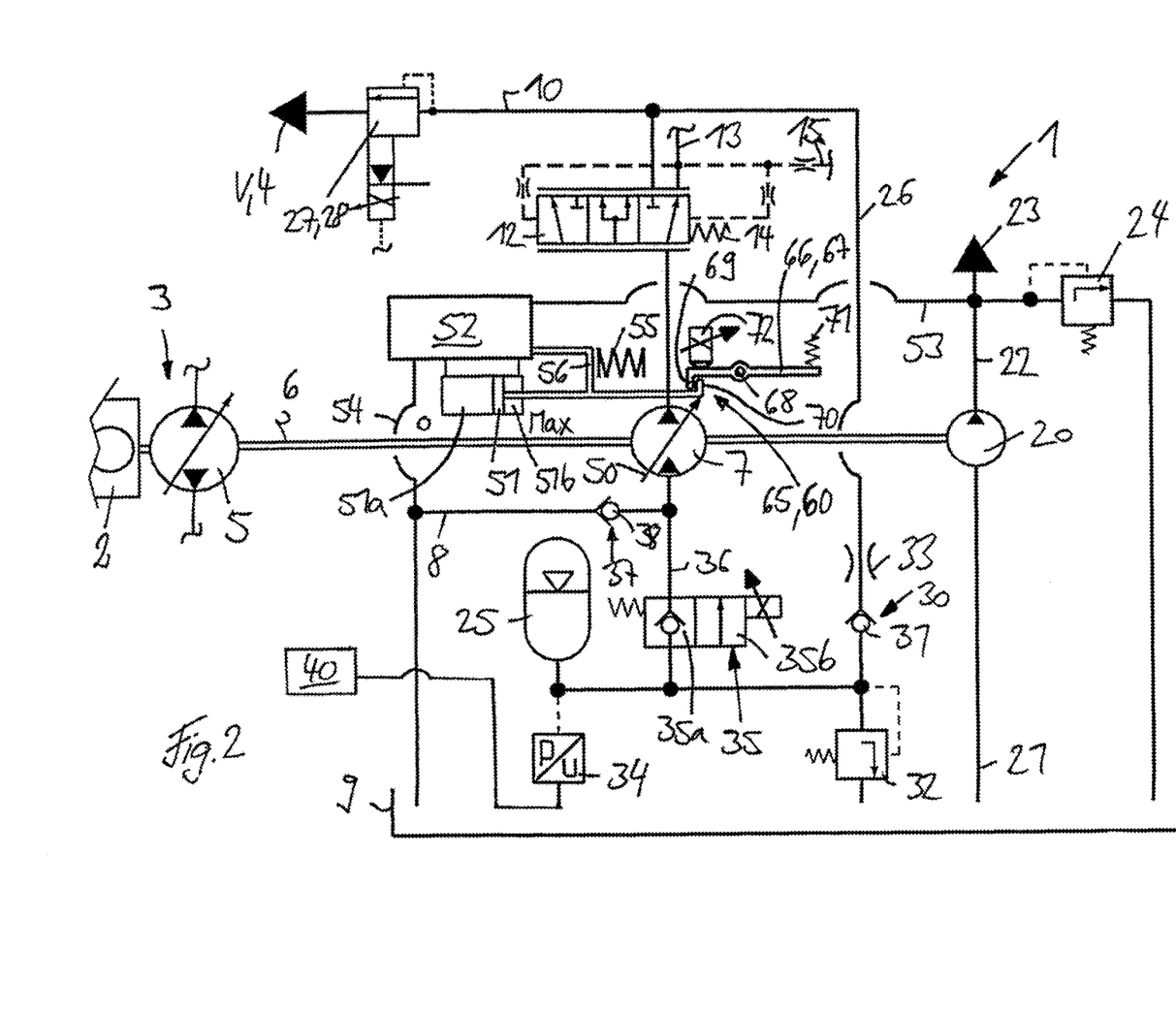
FIG. 2 shows a vehicle drive train with a second embodiment of a power unit of the invention.

FIG. 2 illustrates a second exemplary embodiment of a power unit of the invention, in which identical components are identified with the same reference numbers discussed above.

Instead of the hydraulic securing device 60 in FIG. 1, FIG. 2 shows the securing device 60 in the form of a mechanical interlock 65 of the displacement volume control device 50 in the position with maximum displacement volume. The mechanical interlock 65 includes interlocking means 66 (also referred to as an interlocking arrangement), which can be actuated between an interlocked position and a released position. In the interlocked position, the interlocking means 66 can be brought into a positive interlocking operational connection with the displacement volume control device 50, which is in the position with the maximum displacement volume. In the illustrated exemplary embodiment, the interlocking means 66 are shown in the form of a lever 67 that can swivel around a swiveling axis 68. The lever 67 is provided with an interlocking lug 69 which, in the interlocked position, interacts with an interlocking segment 70 of the displacement volume control device 50 and is engaged in the latter.

In the illustrated exemplary embodiment, the interlocking means 66 in the form of an interlocking lever 67 are displaced by a spring device 71, such as a compression spring, into the released position and can be actuated into the interlocked position by an electrical actuated device 72, such as an actuating magnet. For purposes of actuation, the electrical actuated device 72 is connected with the electronic control device 40.

In the exemplary embodiment illustrated in FIG. 2, the displacement volume control device 50 is also displaced into the position with maximum displacement volume by a corresponding actuation of the positioning device 52 chronologically before the stopping (and therefore the shut-off) of the internal combustion engine 2. After it reaches this position, the interlocking means 66 are actuated into the interlocked position by a corresponding actuation of the actuator device 72, so that the displacement volume control device 50 is positively held in the position with the maximum displacement volume while the internal combustion engine 2 is shut off During a starting process of the internal combustion engine 2 and an actuation of the control valve 35 into the open position 35b, in which hydraulic fluid flows out of the charged hydraulic accumulator 25 to the suction side of the power unit 7, because the displacement volume control device 50 is already in the position with the maximum displacement volume, a direct operation of the power unit 7 as a motor makes it possible to quickly start the internal combustion engine 2 without prior displacement of the displacement volume control device 50 into the position with maximum displacement volume. A starting process of the internal combustion engine 2 with the power unit 7 of the invention therefore takes place in a start-stop function in a short period of time.

A rotational speed sensor can be provided and connected with the control device 40 and in communication with the output shaft 6 or with the internal combustion engine 2. After the starting process of the internal combustion engine 2 and, thus, once the internal combustion engine 2 is running on its own, via the rotational speed sensor, the actuation of the actuator device 72 is ended, so that the interlocking means 66 are displaced by the spring device 71 into the released position, so that the displacement volume control device 50 is released.

It will be readily appreciated by those skilled in the art that modifications may be made to the invention without departing from the concepts disclosed in the foregoing description. Accordingly, the particular embodiments described in detail herein are illustrative only and are not limiting to the scope of the invention, which is to be given the full breath of the appended claims and any and all equivalents thereof.

The invention claimed is:

1. A hydrostatic power unit, comprising:
a variable displacement machine with a continuously variable displacement volume and operable as a pump and motor;
an internal combustion engine, with the variable displacement machine in a drive connection with the internal combustion engine;
a hydraulic fluid tank, wherein when operated as a pump, a suction side of the variable displacement machine sucks hydraulic fluid out of the hydraulic fluid tank and delivers the hydraulic fluid into a delivery line that leads to at least one consumer and, when operated as a motor, the variable displacement machine operates as a hydraulic starter to start the internal combustion engine, wherein the variable displacement machine operated as a motor is supplied with hydraulic fluid on the suction side from a hydraulic accumulator, wherein a displacement volume of the variable displacement machine is set by a displacement volume control device actuated by a positioning device, and
an electrically actuated control valve for control of a connection of the hydraulic accumulator with the suction side of the variable displacement machine,
wherein the displacement volume control device is displaced into a position with a maximum displacement volume by a corresponding actuation of the positioning device chronologically prior to shutoff of the internal combustion engine, and wherein a securing device holds the displacement volume control device in the position with maximum displacement volume when the internal combustion engine is shut off,
wherein for a supply of hydraulic fluid, the positioning device is connected to a charging pressure circuit and to the hydraulic accumulator, and the securing device is a shutoff valve located in a connecting line of the positioning device with the charging pressure circuit,
wherein the positioning device is supplied with hydraulic fluid from the hydraulic accumulator independently of the position of the control valve, and
wherein the control valve is located in a connecting line that leads from the hydraulic accumulator to an intake line of the variable displacement machine, wherein the intake line leads from the hydraulic fluid tank to the suction side of the variable displacement machine, and a hydraulic line to supply the positioning device with hydraulic fluid from the hydraulic accumulator and connected upstream of the control valve to the connecting line.

2. The hydrostatic power unit as recited in claim 1, wherein the shutoff valve is a check valve that shuts off flow to the charging pressure circuit.

3. The hydrostatic power unit as recited in claim 1, including a control pressure line connected to the hydraulic line, wherein the shutoff valve is located in the control pressure line, and wherein the control pressure line leads from the charging pressure circuit to the positioning device, and wherein the hydraulic line is connected to the control pressure line between the shutoff valve and the positioning device.

4. The hydrostatic power unit as recited in claim 1, wherein the displacement volume control device is actuated by a spring device toward a minimum displacement volume.

5. The hydrostatic power unit as recited in claim 1, wherein the variable displacement machine is a unilaterally variable displacement power unit, and the displacement volume control device of the power unit is displaced, starting from a position with a minimum displacement volume, in one displacement direction.

6. The hydrostatic power unit as recited in claim 1, wherein the consumer comprises working hydraulics of a machine and the variable displacement machine operated as a pump supplies the working hydraulics with hydraulic fluid.

7. The hydrostatic power unit as recited in claim 1, wherein the variable displacement machine is an axial piston machine having a swashplate construction.

8. A drive train of a mobile machine, comprising:
a hydrostatic variable displacement machine with a continuously variable displacement volume and operable as a pump and motor;
an internal combustion engine, with the variable displacement machine in a drive connection with the internal combustion engine;
a hydraulic fluid tank, wherein when operated as a pump, a suction side of the variable displacement machine sucks hydraulic fluid out of the hydraulic fluid tank and delivers the hydraulic fluid into a delivery line that leads to at least one consumer and, when operated as a motor, the variable displacement machine operates as a hydraulic starter to start the internal combustion engine, wherein the variable displacement machine operated as a motor is supplied with hydraulic fluid on the suction side from a hydraulic accumulator, wherein a displacement volume of the variable displacement machine is set by a displacement volume control device actuated by a positioning device, and an electrically actuated control valve for control of a connection of the hydraulic accumulator with the suction side of the variable displacement machine, wherein the displacement volume control device is displaced into a position with a maximum displacement volume by a corresponding actuation of the positioning device chronologically prior to shutoff of the internal combustion engine, and wherein a securing device holds the displacement volume control device in the position with maximum displacement volume when the internal combustion engine is shut off, wherein when the variable displacement machine is operated as a motor it forms a hydraulic starter for the internal combustion engine and when operated as a pump supplies a working hydraulics of the machine with hydraulic fluid, wherein for a supply of hydraulic fluid, the positioning device is connected to a charging pressure circuit and to the hydraulic accumulator, and the securing device is a shutoff valve located in a connecting line of the positioning device with the charging pressure circuit, wherein the positioning device is supplied with hydraulic fluid from the hydraulic accumulator independently of the position of the control valve, and wherein the control valve is located in a connecting line that leads from the hydraulic accumulator to an intake line of the variable displacement machine, wherein the intake line leads from the hydraulic fluid tank to the suction side of the variable displacement machine, and a hydraulic line to supply the positioning device with hydraulic fluid from the hydraulic accumulator and connected upstream of the control valve to the connecting line.

9. A method of operating a drive train, the drive train comprising:

a hydrostatic variable displacement machine with a continuously variable displacement volume and operable as a pump and motor;

an internal combustion engine, with the variable displacement machine in a drive connection with the internal combustion engine;

a hydraulic fluid tank, wherein when operated as a pump, a suction side of the variable displacement machine sucks hydraulic fluid out of the hydraulic fluid tank and delivers the hydraulic fluid into a delivery line that leads to at least one consumer and, when operated as a motor, the variable displacement machine operates as a hydraulic starter to start the internal combustion engine, wherein the variable displacement machine operated as a motor is supplied with hydraulic fluid on the suction side from a hydraulic accumulator, wherein a displacement volume of the variable displacement machine is set by a displacement volume control device actuated by a positioning device, wherein the displacement volume control device is displaced into a position with a maximum displacement volume by a corresponding actuation of the positioning device chronologically prior to shutoff of the internal combustion engine, and wherein a securing device holds the displacement volume control device in the position with maximum displacement volume when the internal combustion engine is shut off, and wherein when the variable displacement machine is operated as a motor it forms a hydraulic starter for the internal combustion engine and when operated as a pump supplies a working hydraulics of the machine with hydraulic, the method comprising:

chronologically prior to the shutoff of the internal combustion engine, displacing the displacement volume control device of the variable displacement machine into the position with maximum displacement volume by actuation of the positioning device and maintaining this position by the securing device while the internal combustion engine is shut off.

10. The method as recited in claim 9, wherein when the displacement volume control device reaches the position with the maximum displacement volume, an interlocking arrangement is actuated into an interlocked position, and after starting the internal combustion engine, the interlocking arrangement is actuated into a released position.

11. The method as recited in claim 9, wherein the securing device comprises a mechanical interlock of the displacement volume control device.

12. The method as recited in claim 11, wherein the mechanical interlock comprises an interlocking arrangement having an interlocked position and a released position, which interlocking arrangement is brought into a positive operative connection with the displacement volume control device in the position with maximum displacement volume.

13. The method as recited in claim 12, wherein the interlocking arrangement comprises an interlocking lever.

14. The method as recited in claim 12, wherein the interlocking arrangement is actuated into a released position by a spring device, and is actuated into an interlocked position by an electrical actuator device.

15. The method as recited in claim 14, wherein the electrical actuator device comprises a magnetic actuator.

16. The method as recited in claim 13, wherein the interlocking arrangement is actuated into the interlocked position when the displacement volume control device reaches the position with the maximum displacement volume.

17. The method as recited in claim 13, wherein the interlocking arrangement is actuated into the released position after the starting process of the internal combustion engine.

* * * * *

UNITED STATES PATENT AND TRADEMARK OFFICE
CERTIFICATE OF CORRECTION

PATENT NO. : 9,709,046 B2  
APPLICATION NO. : 14/082547  
DATED : July 18, 2017  
INVENTOR(S) : Lukas Krittian et al.

It is certified that error appears in the above-identified patent and that said Letters Patent is hereby corrected as shown below:

On the Title Page

Column 1, Item (72) Inventors, Line 4, delete "Ascahffenburg" and insert -- Aschaffenburg --

Signed and Sealed this  
Third Day of October, 2017

Joseph Matal  
*Performing the Functions and Duties of the*  
*Under Secretary of Commerce for Intellectual Property and*  
*Director of the United States Patent and Trademark Office*